Dec. 13, 1966 TETSUJI TAKAHASHI 3,291,917

AUTOMATIC DIALER FOR TELEPHONES HAVING A MAGNETIC MEMORY

Filed July 9, 1963 4 Sheets-Sheet 1

INVENTOR.
TETSUJI TAKAHASHI

BY Kurt Kelman

AGENT

AUTOMATIC DIALER FOR TELEPHONES HAVING A MAGNETIC MEMORY

Filed July 9, 1963 4 Sheets-Sheet 2

INVENTOR.
TETSUJI TAKAHASHI
BY
Kurt Kelman
AGENT

INVENTOR.
TETSUJI TAKAHASHI
BY Kurt Kelman
AGENT

Dec. 13, 1966 TETSUJI TAKAHASHI 3,291,917

AUTOMATIC DIALER FOR TELEPHONES HAVING A MAGNETIC MEMORY

Filed July 9, 1963 4 Sheets-Sheet 4

INVENTOR.
TETSUJI TAKAHASHI

BY Kurt Kelman

AGENT

United States Patent Office 3,291,917

Patented Dec. 13, 1966

3,291,917
AUTOMATIC DIALER FOR TELEPHONES HAVING A MAGNETIC MEMORY

Tetsuji Takahashi, Kanagawa-ken, Japan, assignor to Nippon Communication Industrial Co., Ltd., Kanagawa-ken, Japan Filed July 9, 1963, Ser. No. 293,794
5 Claims. (Cl. 179—90)

This invention relates to an automatic telephone dialer, called an autodialer, for memorizing and reading out subscribers' telephone numbers.

In general, the desirable characteristics of an autodialer are (1) a large capacity for memorizing telephone numbers, (2) simplicity of operation in memorizing, and (3) one-touch operation, such as that of a push-button, for reading out or calling another subscriber's number. According to the invention, these desiderata are attained by a system including a magnetic core matrix memory.

The object of the invention is to provide a simple, efficient autodialer having, to a high degree, the advantages enumerated above.

Other objects and advantages of the invention will become apparent and the invention will be fully understood from the following description and the accompanying drawings wherein.

Figure 1:
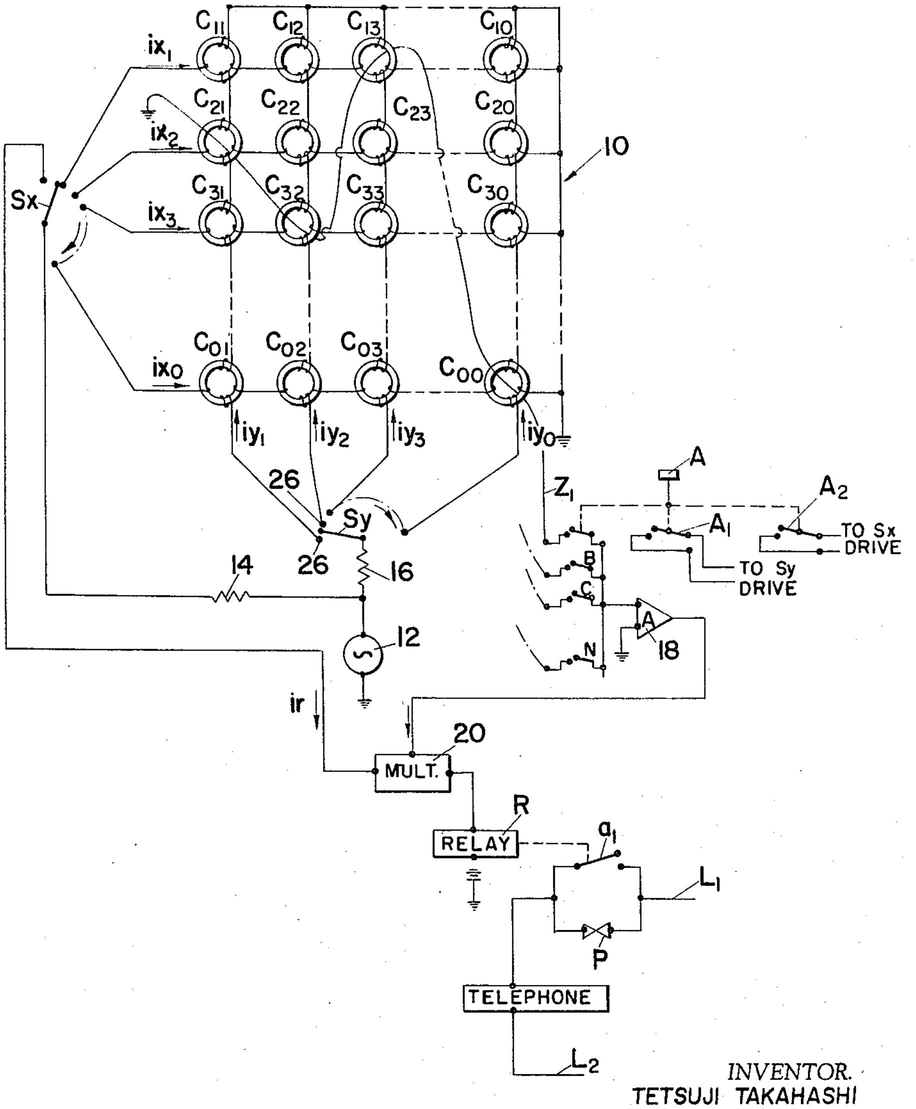
FIG. 1 is a schematic circuit diagram of an embodiment of the invention.

Referring to FIG. 1, a digital memory 10 of the magnetic core matrix type is shown. The principles of operation of memories of this type are well known and, therefore, will be set forth herein only to the extent necessary to describe the invention. Cores $C_{01}$ . . . $C_{00}$ are shown having $x$ and $y$ wires passing through them, and in effect having one $x$ and one $y$ wire winding on each core. Currents $ix_1$ . . . $ix_0$ and $iy_1$ . . . $iy_0$ are supplied from source 12 through resistors 14 and 16, and switches $Sx$ and $Sy$ to the $x$ and $y$ wires. Although an A.C. source is shown, it is understood that a D.C. source may also be used. The number of $x$-axis exciting wires, that is the number of horizontal rows of cores, is equal to the number of values each digit of the telephone number may have and, in the usual numerical dialing system, this is ten, corresponding to 1, 2, 3, . . . 0. In other types of dialing systems, such as the "2 out of 5" type, a smaller number of $x$ wires would suffice. The number of $y$ wires is equal to the number of places or digits in a subscriber's number.

Figure 2:
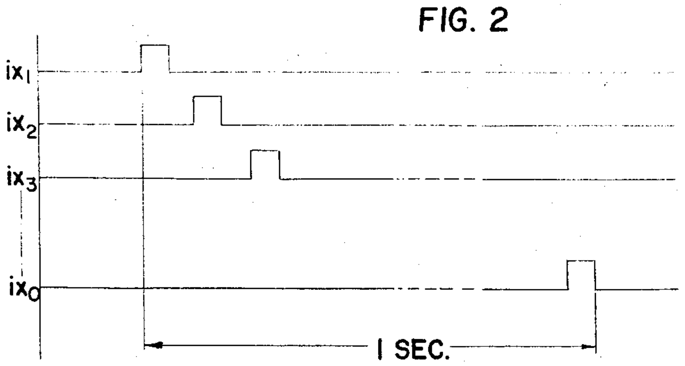
FIG. 2 is a wave form diagram of the exciting currents in the $x$-axis windings of the matrix.
Figure 3:
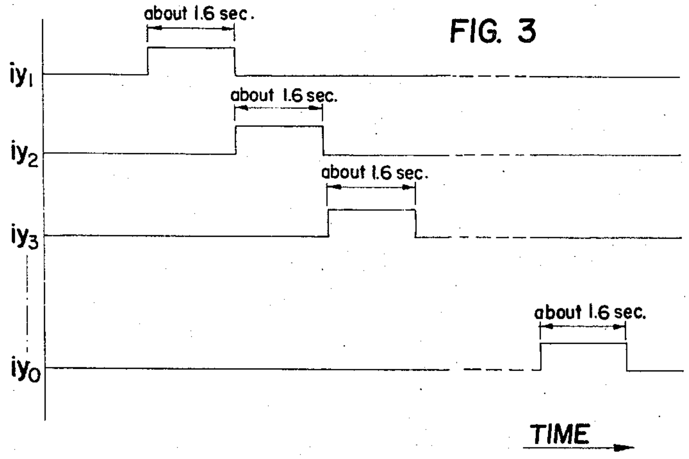
FIG. 3 is a wave form diagram of the currents in the $y$-axis windings of the matrix.

Switch $Sx$ rotates step by step with the same interval from one step to the next as the dial pulse interval, so that current pulses $ix_1$, $ix_2$, etc., will have the time relation shown in FIG. 2. Changeover switch $Sy$ rotates one step for each complete rotation of switch $Sx$, so that the pulse time relation of currents $iy_1$, $iy_2$, etc., will be as indicated in FIG. 3. Switch $Sx$ may be, essentially, a conventional 10-position rotary selector switch having the usual stepping relay. Switch $Sy$ is preferably driven by a synchronous motor M, FIG. 5, energized from a commercial power source 22 through push button contacts $A_1$. The motor drives 10 cams 24, which actuate switch contacts 26 connected to the $y$-axis wires of switch $Sy$. Motor M also rotates dial impulse cam 28 to actuate dial impulse contacts P. Cam 30 is arranged to actuate switch contacts 32 connected in the circuit of the stepping relay of switch $Sx$ to synchronize its operation with switch $Sy$ so that $Sx$ rotates one cycle while $Sy$ closes each switch contact 26. Other synchronizing means will be apparent to those skilled in the art. Alternatively, the switches may be of other known types, such as electronic switches.

Figure 4:
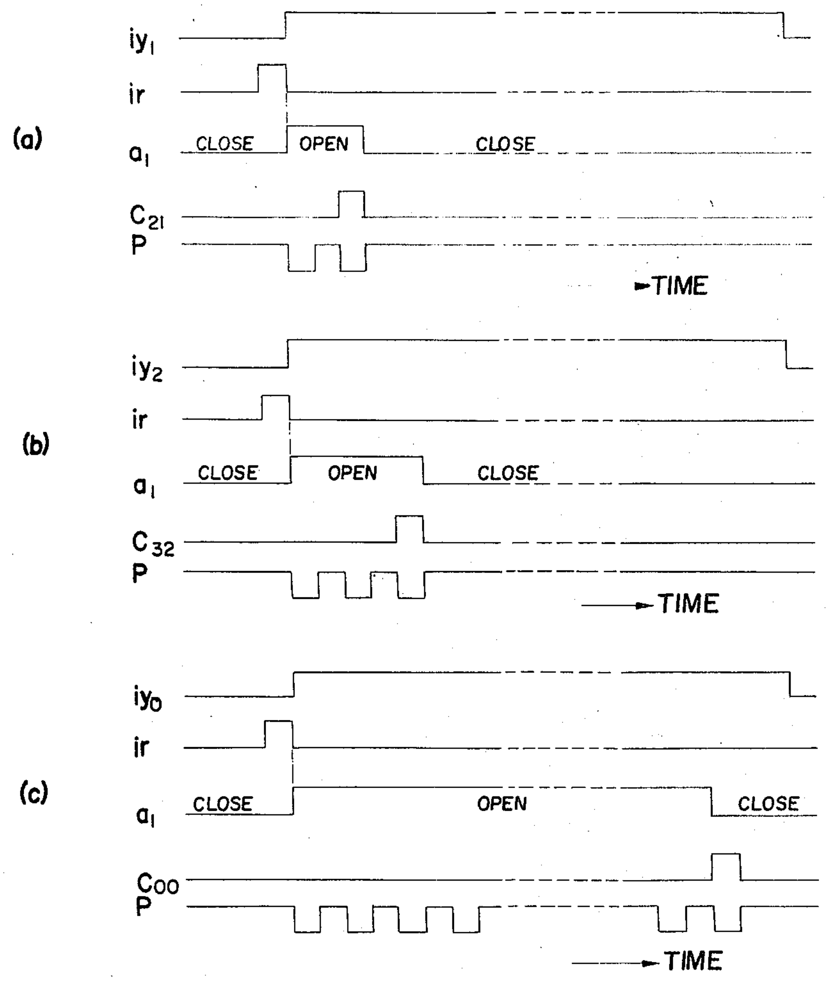
FIG. 4 is a wave form diagram which is explanatory of the operation of the invention.
Figure 5:
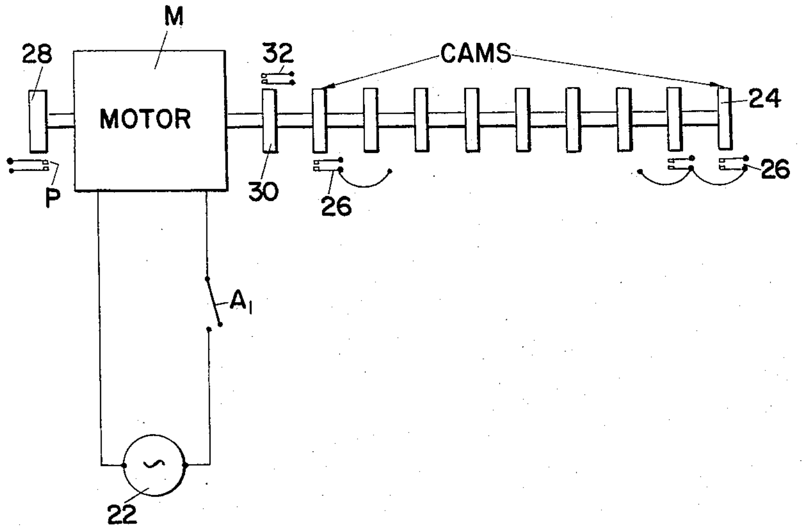
FIG. 5 is a schematic diagram of a switching arrangement which may be used in the invention.

Subscribers' numbers are readily memorized in matrix 10 by passing the read-out wires $Z_1$ etc. through selected cores. Thus, read-out wire $Z_1$ is arranged so that number 2310 is memorized. It is understood that when $x$-axis current $ix$ and $y$-axis current $iy$ are coincident in one of the cores, a change of magnetic flux occurs and some voltage is induced in the read-out wire through that core. The cores are made from a material having a rectangular hysteresis loop and each is biased with a D.C. current, in a manner which is well known and therefore not shown, so that appreciable flux is not induced only by $x$-axis current or only by $y$-axis current. Wire $Z_1$ is shown connected to pushbutton switch A, and other readout wires are connected to other pushbutton switches B, C . . . N, through which the read-out wires are connected to amplifier 18 and multivibrator 20. Thus, when pushbutton A is closed, amplifier 18 will receive current pulses, as indicated on lines $C_{21}$, $C_{32}$ and $C_{00}$ of FIG. 4 (as well as other pulses not shown). The relation of these current pulses to currents $iy_1$, $iy_2$ . . . $iy_0$ are also shown in FIG. 4. The output of amplifier 18 is fed to bistable multivibrator 20 which, in turn, is connected to relay R having a movable contact $a_1$, which is connected in parallel with dialing impulse contacts P. The usual cam 28 for opening and closing impulse contacts P may be rotated by motor M which drives switch $Sy$, as shown in FIG. 5.

When switch $Sx$ is on its first contact, a pulse $ir$ (see FIG. 4) is transmitted from source 12 to reset multivibrator 20, and thereby causes relay R to open contact $a_1$ until amplifier 18 impresses a pulse ($C_{21}$, $C_{32}$, $C_{00}$ in FIG. 4) on multivibrator 20. During the open period of contact $a_1$, dial pulse contacts P produce the pulses shown at P in FIG. 4, the number of P pulses for each digit corresponding to the number stored in the memory for that digit. These pulses are impressed on the telephone line $L_1$, $L_2$.

The number of telephone numbers which are memorized is determined by the number of read-out wires. If small cores are used, having a diameter of about one centimeter, about one hundred telephone numbers can be memorized in a small autodialer unit.

It will be apparent to those skilled in the art that techniques equivalent to those described above may be employed. Thus, an A.C. current of one frequency $f_1$ may be applied to the $x$-axis wires and current of another frequency $f_2$ to the $y$-axis wires, and then detecting the simultaneous presence in the read-out current of both frequencies $f_1$ and $f_2$ at each core. When this mode of operation is employed, the cores need not have a rectangular hysteresis characteristic. Various other modifications of the invention will be apparent and, therefore, it is not to be construed as limited, except as defined in the claims.

I claim:

1. Automatic telephone dialing apparatus comprising:
   (a) a magnetic core matrix memory having $x$-axis and $y$-axis sets of exciting windings on the cores thereof,
   (b) first means for cyclically impressing current pulses on one set of windings sequentially at a rate corresponding to the desired rate of dialing pulses,
   (c) second means for impressing current on each winding, in turn, of the other set for an interval at least equal to the length of a complete cycle of the first means, and
   (d) a read-out wire threaded through selected cores for reading out pulses corresponding in time of occurrence to a desired telephone number, each selected core being in a different column of the matrix memory.

2. Apparatus according to claim 1, wherein said first and second means include first and second stepping switches and a common source of current connected thereto, the period of a complete cycle of the first switch being at least equal to the period of one step of the second switch.

3. Apparatus according to claim 2, including a plurality of read-out wires each threaded through cores corresponding to a desired telephone number, an output device, and means for selectively connecting any one of said read-out wires to the output device.

4. Apparatus according to claim 3, including means connected to said output device for generating dialing pulses at a uniform rate from the beginning of each cycle of said first stepping switch until a current pulse is received by said output device from a read-out wire connected thereto.

5. Apparatus according to claim 4, wherein said dial pulse generating means includes a multivibrator, a connection from a contact of said first stepping switch for resetting said multivibrator, a connection from said output device to the multivibrator for triggering the same, dialing pulse producing contacts connected to a telephone line, and a relay connected to the output of the multivibrator and having actuating contacts in parallel with said dialing pulse producing contacts, whereby the latter are enabled to produce pulses when the relay contacts are open.

References Cited by the Examiner

UNITED STATES PATENTS 3,218,634 11/1965 Olson ---------- 179—90.2 X

KATHLEEN H. CLAFFY, *Primary Examiner.*

S. J. BOR, H. ZELLER, *Assistant Examiners.*